United States Patent
Kim

(10) Patent No.: US 10,333,429 B1
(45) Date of Patent: Jun. 25, 2019

(54) METHOD FOR CONTROLLING INVERTER

(71) Applicant: LSIS CO., LTD., Anyang-si, Gyeonggi-do (KR)

(72) Inventor: Hyo-Jin Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/210,206

(22) Filed: Dec. 5, 2018

(30) Foreign Application Priority Data

Jun. 18, 2018 (KR) .......................... 10-2018-0069669

(51) Int. Cl.
  *H02M 7/538* (2007.01)
  *H02M 7/5387* (2007.01)
  *H02H 9/04* (2006.01)

(52) U.S. Cl.
  CPC ........ *H02M 7/53871* (2013.01); *H02H 9/045* (2013.01)

(58) Field of Classification Search
  CPC .......................... H02M 7/53871; H02H 9/045
  See application file for complete search history.

(56) References Cited

U.S. PATENT DOCUMENTS

2010/0226152 A1* 9/2010 Mechi ....................... H01G 9/28
363/47

FOREIGN PATENT DOCUMENTS

| JP | 2016025776 A | 2/2016 |
| KR | 100977013 B1 | 8/2010 |

* cited by examiner

*Primary Examiner* — Adolf D Berhane
*Assistant Examiner* — Afework S Demisse
(74) *Attorney, Agent, or Firm* — K&L Gates LLP

(57) ABSTRACT

The present disclosure provides a method for controlling an inverter in an inverter system including the inverter, wherein the inverter includes a direct current-link capacitor, an inverting unit and a control unit, wherein the method comprises: when a direct current-link voltage of the direct current-link capacitor is greater than or equal to a predefined first voltage and is smaller than a second voltage which is greater than the first voltage, calculating a value using the direct current-link voltage and a time, and accumulating the calculated value over time to generate a cumulative value; when the cumulative value is greater than or equal to a predefined first value, blocking an output of the inverting unit; and when the direct current-link voltage is smaller than the first voltage, obtaining a value by subtracting a second predefined value from the cumulative value, and updating the cumulative value as the obtained value.

6 Claims, 4 Drawing Sheets

METHOD FOR CONTROLLING INVERTER

CROSS-REFERENCE TO RELATED APPLICATION

Pursuant to 35 U.S.C. § 119(a), this application claims the benefit of earlier filing date and right of priority to Korean Application No. 10-2018-0069669, filed on Jun. 18, 2018, in the Korean Intellectual Property Office, the disclosure of which is incorporated herein in its entirety by reference.

TECHNICAL FIELD

The present disclosure relates to a method for controlling an inverter.

BACKGROUND

An inverter is an inverse-converting device that electrically convert direct current (DC) to alternating current (AC). The inverter used in the industry receives a power supplied from a commercial power supply, varies a voltage and frequency thereof on its own, and supplies the varied voltage and frequency to a motor. In other words, the inverter is defined as a series of devices that control the motor velocity to be used with high efficiency. The inverter may be controlled by a variable voltage variable frequency (VVVF) scheme. The inverter may vary the voltage and frequency input to the motor based on pulse width modulation (PWM) output.

FIG. 1 shows a typical inverter configuration.

Generally, an inverter 100 receives an alternating current power of three phases and a rectifier 110 rectifies the alternating current power. A direct current-link capacitor 120 may smooth and store a direct current voltage rectified by the rectifier 110. An inverting unit 130 converts the direct current voltage stored in the direct current-link capacitor 120 based on the PWM control signal. Thus, the inverting unit outputs an alternating current voltage having a predefined voltage and frequency and may provide the same to the motor. The inverting unit 130 includes three legs. In each leg, two switching elements are connected in series.

When the direct current-link voltage becomes 820 V, which is a rated voltage of the direct current-link capacitor, irrespective of the magnitude of the input voltage as input to the rectifier 110, an overvoltage fault may cause the inverter 100 to stop operating.

In a conventional case, during the operation of the inverter 100, the direct current-link voltage rarely exceeds the rated voltage of the direct current-link capacitor 120. However, depending on a local region, a fluctuation of the input voltage is large. Thus, during the operation of the inverter 100, the direct current-link voltage exceeds the rated voltage of the direct current-link capacitor 120, thereby causing the direct current-link overvoltage fault and thus causing the inverter 100 to stop.

In this case, a lifetime condition of the capacitor specified in a surge voltage test as E60384-4 capacitor test is not satisfied. Thus, there is a problem in that the capacitor may be damaged.

SUMMARY

A technical purpose to be achieved by the present disclosure is to provide a method for controlling an inverter in which when an input voltage becomes high, increasing an operable region of the inverter allows the inverter to continuously operate.

Further, a technical purpose to be achieved by the present disclosure is to provide a method for controlling an inverter, in which the method may satisfy a lifespan condition of a direct current-link capacitor without requiring a hardware change.

In one aspect of the present disclosure, there is provided a method for controlling an inverter in an inverter system including the inverter, wherein the inverter includes a direct current-link capacitor, and an inverting unit including a plurality of switching elements, wherein the inverter system includes a control unit for controlling the inverting unit, wherein the method comprises: checking, by the control unit, whether a direct current-link voltage of the direct current-link capacitor is equal to or greater than a predefined first voltage; checking, by the control unit, whether the direct current-link voltage is greater than or equal to a second voltage greater than the first voltage; when the direct current-link voltage is greater than or equal to the first voltage and is smaller than the second voltage, calculating, by the control unit, a value using the direct current-link voltage and a time, and accumulating, by the control unit, the calculated value over time to generate a cumulative value; when the cumulative value is greater than or equal to a predefined first value, blocking, by the control unit, an output of the inverting unit; and when the direct current-link voltage is smaller than the first voltage, obtaining, by the control unit, a value by subtracting a second predefined value from the cumulative value, and updating, by the control unit, the cumulative value as the obtained value.

In one embodiment, the method further comprises, when the direct current-link voltage is greater than or equal to the second voltage, blocking the output of the inverting unit by the control unit.

In one embodiment, the value calculated using the direct current-link voltage and the time is $V^2t$, where V indicates the direct current-link voltage, and t indicates a unit time.

In one embodiment, the method further comprises, after updating the cumulative value as the obtained value and when the updated cumulative value is smaller than 0, updating the cumulative value to 0 by the control unit.

In one embodiment, the method further comprises, when a predefined time period has elapsed after the output of the inverting unit is blocked, when the direct current-link voltage is within a rated voltage range, disabling, by the control unit, the blocking of the output of the inverting unit.

In one embodiment, the second value is defined as a constant such that the first value–the second value=zero for a predefined unit time.

A technical effect of the present disclosure may include followings but may not be limited thereto:

The direct current-link capacitor may be protected from a problem occurring when the overvoltage state of the direct current-link capacitor is maintained since the input voltage fluctuation of the inverter is large, or a voltage from the motor is regenerated. Further, a situation that frequent overvoltage faults when the input voltage is high disallow the continuous operation of the inverter may be avoided.

DETAILED DESCRIPTIONS

Figure 1:
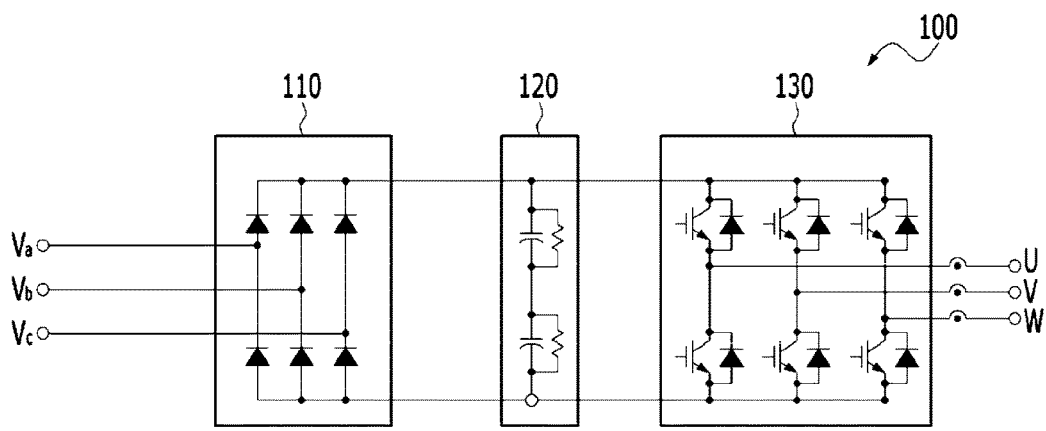
FIG. 1 shows a typical inverter configuration.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, a method for controlling an inverter according to an embodiment of the present disclosure will be described with reference to FIG. 2 and FIG. 3.

Figure 2:
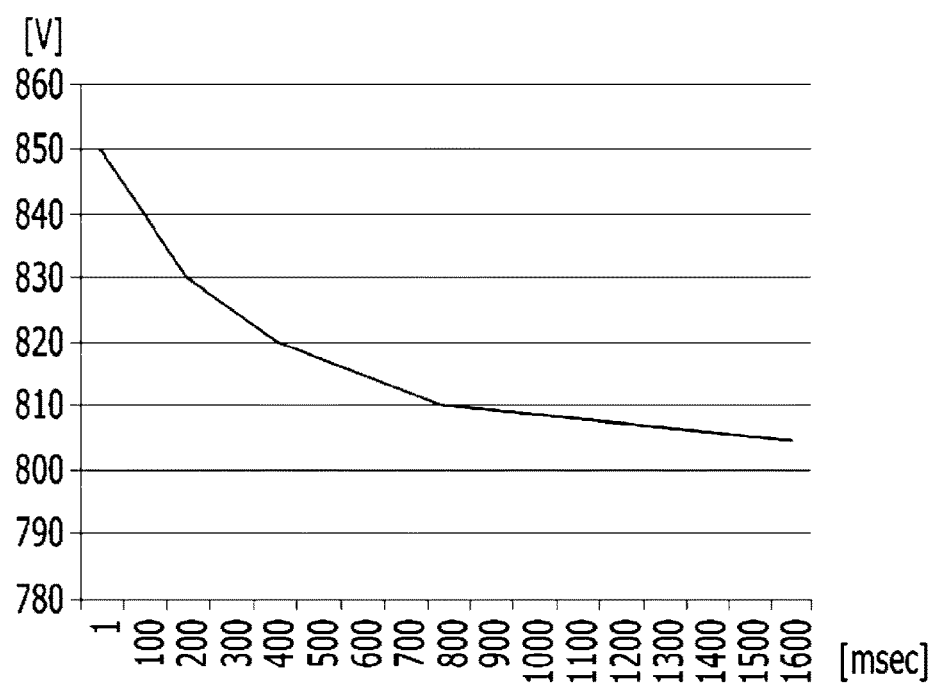
FIG. 2 illustrates an example of a time it will take for an overvoltage fault to occur based on a direct current-link voltage.

FIG. 2 illustrates an example of a time it will take for an overvoltage fault to occur based on a direct current-link voltage.

Referring to FIG. 2, in the case where the direct current-link voltage is, for example, 850 V, the time required for the occurrence of the overvoltage fault is about 1 msec. When the direct current-link voltage is 820V, the time it takes for an overvoltage fault to occur is about 400 msec. As a result, the larger the direct current-link voltage, the shorter the time required for an overvoltage fault to occur.

As the input voltage increases, the voltage of the capacitor 20 exceeds the rated voltage of the direct current-link capacitor 20. Alternatively, the voltage of the motor is applied to the direct current-link capacitor 20 via regeneration such that the voltage of the capacitor 20 rises sharply. In those cases, the lifespan of the capacitor 20 may be shortened. Thus, a method for controlling an inverter according to an embodiment of the present disclosure may be configured such that an inverse time characteristic is present in the specification guaranteed by the IEC 60383 4-14 standard, in order to protect the capacitor 20.

According to one embodiment of the present disclosure, the inverter is disabled for 5 seconds after an overvoltage fault occurs in the inverter. When the direct current-link capacitor voltage is within the rated voltage of the capacitor 20 after 5 seconds after the overvoltage occurs, the fault is released, such that the inverter 1 is enabled.

The stress of the capacitor 20 is weighted by the voltage. Thus, in one embodiment of the present disclosure, the method calculates $V^2 t$, and calculates a cumulative value of $V^2 t$. When the cumulative value of $V^2 t$ is greater than or equal to a predetermined reference value $\beta$, the method generates an overvoltage fault signal. When the direct current-link voltage is greater than or equal to 805V, $V^2 t$ is continuously accumulated. When the direct current-link voltage is smaller than 805V, the cumulative value may be reduced by a predetermined value $\alpha$. In this connection, $\alpha$ may be defined as a constant such that $\beta - \alpha = $ zero for 5 seconds.

Figure 3:
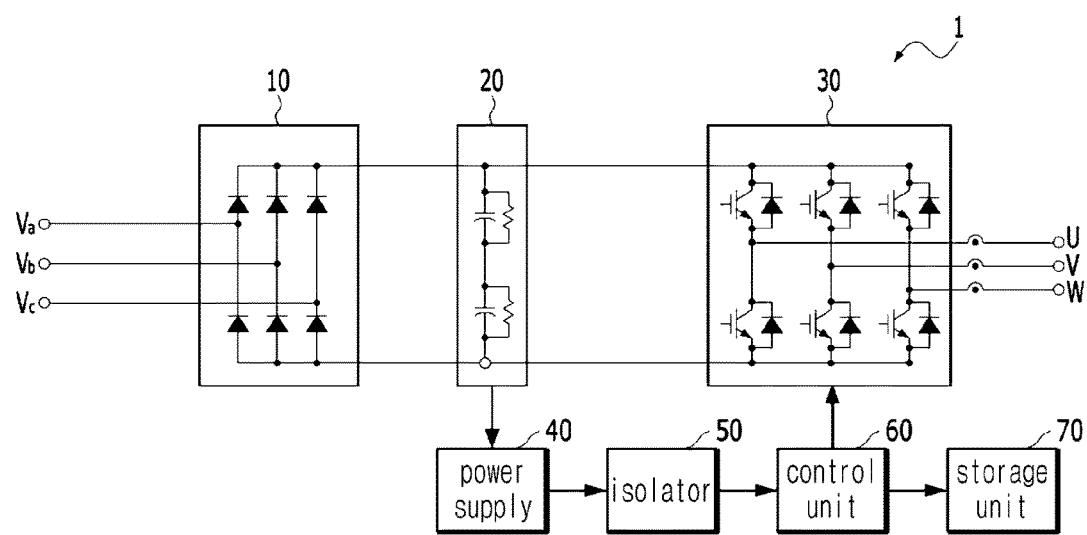
FIG. 3 is a block diagram of an inverter system including an inverter control device according to an embodiment of the present disclosure.

FIG. 3 is a block diagram of an inverter system including an inverter control device according to an embodiment of the present disclosure.

As shown in FIG. 3, the inverter 1 in accordance with one embodiment of the present disclosure includes a rectifier 10, a direct current-link capacitor 20, and an inverting unit 30. The inverter system may include the inverter 1, a power supply 40, an isolator 50, and a control unit 60. The inverter control device may include a power supply 40, an isolator 50, and a control unit 60.

The rectifier 10 may rectify an input three-phase power. The direct current-link capacitor 20 may smooth and store the power. The direct current-link capacitor 20 may be composed of a series connection between two or more capacitors. The inverting unit 30 includes a plurality of semiconductor switching elements. The voltage stored in the direct current-link capacitor 20 may be converted to a three-phase alternating current voltage via on/off operations of upper and lower switching elements of the three-phase legs.

In one embodiment of the present disclosure, the power supply 40 may be, for example, a switched mode power supply (SMPS). The voltage detected in the direct current-link capacitor 20 may be provided to the power supply 40. The power supply 40 may divide the direct current-link voltage input into a small voltage. For example, when a direct current-link voltage 900V is input to the power supply 40, the power supply 40 may convert the voltage to 200 mV and provide the same to the isolator 50.

The isolator 50 may provide the control unit 60 with the small voltage which results from a division of the direct current-link voltage from the power supply 40. The isolator 50 may be a passive element that transfers a signal in a single direction of a circuit.

According to one embodiment of the present disclosure, the control unit 60 determines the overvoltage state of the direct current-link voltage and blocks a gate signal of the inverting unit 30 based on the determination result to perform the overvoltage protection. Hereinafter, a method for controlling an inverter according to an embodiment of the present disclosure will be described with reference to the drawings. The inverter control device according to an embodiment of the present disclosure further includes a storage unit 70. The storage unit may store data generated by the control unit 60.

Figure 4:
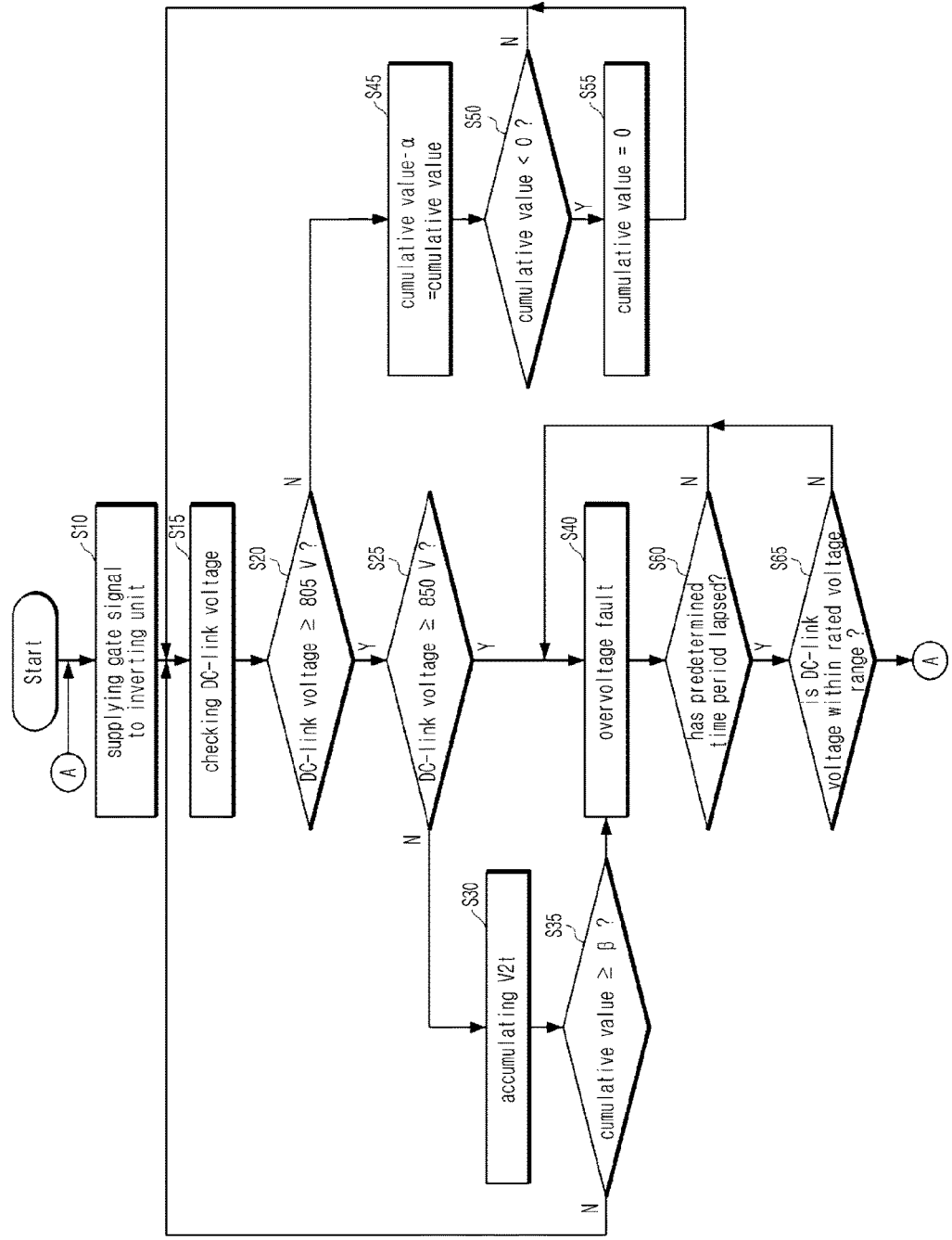
FIG. 4 is a flow chart of a method for controlling an inverter according to one embodiment of the present disclosure.

FIG. 4 is a flow chart illustrating a method for controlling an inverter according to an embodiment of the present disclosure.

As shown in FIG. 4, in a method according to an embodiment of the present disclosure, the control unit 60 applies a gate signal to switching elements of the inverting unit 30 (S10). Thus, the operation of the inverter 1 may be started. The control unit 60 applies a gate signal so that the on/off of the switching elements of the inverting unit 30 may be controlled.

When the output voltage is applied to the motor (not shown) via the on/off operation of the switching elements of the inverting unit 30, the direct current-link voltage may fluctuate. The power supply 40 may receive the direct current-link voltage of the direct current-link capacitor 20 from a voltage detector (not shown). The power supply then converts the DC-link voltage to a small voltage. Then, the converted small voltage may be provided to the control unit 60 through the isolator 50.

The control unit 60 checks the direct current-link voltage. The control unit may check whether the direct current-link voltage is greater than or equal to a predefined first voltage (assuming 805 V in one embodiment of the present disclosure). In one embodiment of the present disclosure, it is assumed that the capacitance of each of the series-connected capacitors of the direct current-link capacitor 20 is 400V. Thus, when two capacitors are connected in series, the first voltage may be 800V in principle. However, in one embodiment of the present disclosure, the first voltage is assumed to be 805 V, with taking into account a margin. It should be understood, however, that this is merely one embodiment of the present disclosure and the disclosure is not limited thereto. The magnitude of the first voltage may be determined based on the number of capacitors connected in series and the capacitance of the individual capacitors.

In a conventional approach, using a comparator, a direct current-link voltage and a comparator reference are compared with each other. It is determined whether overvoltage has occurred based on the comparison result. Based on this determination, the gate signal of the inverting unit 30 is interrupted. That is, when the comparator reference is set to, for example, 820 V, and when the direct current-link voltage exceeds 820V, it is determined that overvoltage occurred. Therefore, when the voltage fluctuation is large, or the voltage is regenerated, such that the overvoltage state of the direct current-link capacitor is maintained, there was a problem that frequent overvoltage fault occurred. The present disclosure aims to solve the problem.

When the direct current-link voltage is greater than 805V, the control unit 60 may determine whether the direct current-link voltage is greater than or equal to a predefined second voltage (e.g., 850 V in one embodiment of the present disclosure). However, in one embodiment of the present disclosure, the second voltage is not limited to 850V. The second voltage may be determined based on the number of capacitors connected in series and the capacitance of the individual capacitors.

When the direct current-link voltage is greater than 850 V in step S25, the control unit 60 determines that the current state is an overvoltage fault. Then, the control unit may block the gate signal to be transmitted to the inverting unit 30 and thus block the output of the inverting unit 30.

When, in S25, the direct current-link voltage is 850 V or smaller, $V^2t$ may be accumulated S30. In this regard, V indicates a direct current-link voltage, and t indicates a preset unit time. The cumulative value may be stored in the storage unit 70.

In this connection, when the cumulative value of $V^2t$ is equal to or greater than the predefined value β, the control unit 60 determines the current state to be an overvoltage fault. Thus, the control unit 60 may block the gate signal transmitted to the inverting unit 30 to block the output of the inverting unit 30. However, when the cumulative value of $V^2t$ is not equal to or larger than the predefined value β, the method proceeds to S15, where the control unit 60 may recheck the direct current-link voltage.

When the output of the inverting unit 30 is blocked due to an overvoltage fault at S40, the control unit 60 determines whether a predefined time period (for example, 5 seconds) has elapsed after the output of the inverting unit 30 is blocked. When the predefined time period has not elapsed, the control unit may maintain the interruption state of the output of the inverting unit 30.

When the predefined time period has elapsed, the control unit 60 checks whether the direct current-link voltage is within the rated voltage range. When the DC link voltage is within the range of the rated voltage, the method proceeds again to S10, where the control unit 60 transmits a gate signal to the switching elements of the inverting unit 30, such that the operation of the inverter 1 may be started. However, when the direct current-link voltage is out of the range of the rated voltage, the control unit may maintain the output blocking state of the inverting unit 30.

In S20, when the direct current-link voltage is not larger than or equal to 805 V, the control unit 60 may calculate a value obtained by subtracting α from the cumulative value and update the calculated value to be the cumulative value S45. In this connection, α may be defined as a constant such that β−α=zero for 5 seconds. However, the embodiment of the present disclosure is not limited thereto. $V^et$ may be accumulated during a time period other than 5 seconds.

When the updated cumulative value of the control unit 60 is smaller than 0 S50, the control unit updates the cumulative value to be 0 S55. The method proceeds again to S15 where the control unit may check the direct current-link voltage.

In this way, the direct current-link capacitor may be protected from a problem occurring when the overvoltage state of the direct current-link capacitor is maintained since the input voltage fluctuation of the inverter is large, or a voltage from the motor is regenerated. Further, a situation that frequent overvoltage faults when the input voltage is high disallow the continuous operation of the inverter may be avoided.

Although the embodiments according to the present disclosure have been described above, they are merely illustrative. It will be understood by those skilled in the art that various changes and modifications may be made without departing from the scope of the present invention. Therefore, the true scope of technical protection of the present disclosure should be determined by the following claims.

What is claimed is:

1. A method for controlling an inverter in an inverter system including the inverter, wherein the inverter includes a direct current-link capacitor, and an inverting unit including a plurality of switching elements, wherein the inverter system includes a control unit for controlling the inverting unit, wherein the method comprises:
   checking, by the control unit, whether a direct current-link voltage of the direct current-link capacitor is equal to or greater than a predefined first voltage;
   checking, by the control unit, whether the direct current-link voltage is greater than or equal to a second voltage greater than the first voltage;
   when the direct current-link voltage is greater than or equal to the first voltage and is smaller than the second voltage, calculating, by the control unit, a value using the direct current-link voltage and a time, and accumulating, by the control unit, the calculated value over time to generate a cumulative value;
   when the cumulative value is greater than or equal to a predefined first value, blocking, by the control unit, an output of the inverting unit; and
   when the direct current-link voltage is smaller than the first voltage, obtaining, by the control unit, a value by subtracting a second predefined value from the cumulative value, and updating, by the control unit, the cumulative value as the obtained value.

2. A method of claim 1, wherein the method further comprises, when the direct current-link voltage is greater than or equal to the second voltage, blocking the output of the inverting unit by the control unit.

3. A method of claim 1, wherein the value calculated using the direct current-link voltage and the time is $V^e t$, where $V$ indicates the direct current-link voltage, and $t$ indicates a unit time.

4. A method of claim 1, wherein the method further comprises, after updating the cumulative value as the obtained value and when the updated cumulative value is smaller than 0, updating the cumulative value to 0 by the control unit.

5. A method of claim 1, wherein the method further comprises, when a predefined time period has elapsed after the output of the inverting unit is blocked, when the direct current-link voltage is within a rated voltage range, disabling, by the control unit, the blocking of the output of the inverting unit.

6. A method of claim 1, wherein the second value is defined as a constant such that the first value−the second value=zero for a predefined unit time.

* * * * *